US011705660B2

(12) United States Patent
Reichel (10) Patent No.: US 11,705,660 B2
(45) Date of Patent: Jul. 18, 2023

(54) SOCKET DEVICE FOR THE TOUCH-PROOF ELECTRICAL CONTACTING OF A CORRESPONDING PLUG DEVICE, PLUG DEVICE AND BATTERY MODULE FOR A HIGH-VOLTAGE BATTERY

(71) Applicant: AUDI AG, Ingolstadt (DE)

(72) Inventor: Patrick Reichel, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 86 days.

(21) Appl. No.: 17/423,984

(22) PCT Filed: Mar. 17, 2020

(86) PCT No.: PCT/EP2020/057285
§ 371 (c)(1),
(2) Date: Jul. 19, 2021

(87) PCT Pub. No.: WO2020/207721
PCT Pub. Date: Oct. 15, 2020

(65) Prior Publication Data
US 2022/0085541 A1 Mar. 17, 2022

(30) Foreign Application Priority Data
Apr. 9, 2019 (DE) ..................... 10 2019 205 050.6

(51) Int. Cl.
*H01R 13/44* (2006.01)
*H01R 11/28* (2006.01)
(Continued)

(52) U.S. Cl.
CPC ........... *H01R 13/44* (2013.01); *H01R 11/283* (2013.01); *H01R 13/621* (2013.01); *H01R 13/64* (2013.01)

(58) Field of Classification Search
CPC .... H01R 13/44; H01R 11/283; H01R 13/621; H01R 13/6456
See application file for complete search history.

(56) References Cited

U.S. PATENT DOCUMENTS 9,004,954 B2 * 4/2015 Baldwin ................. H01R 13/46
439/680
9,065,199 B2 * 6/2015 Mizutani ................. H01R 13/44
(Continued)

FOREIGN PATENT DOCUMENTS

DE 102014203128 A1 8/2015
DE 102014012320 B3 11/2015
(Continued)

OTHER PUBLICATIONS

Notification of Transmittal of Translation of the International Preliminary Report on Patentability dated Oct. 21, 2021, in connection with International Application No. PCT/EP2020/057285; 8 pages.
(Continued)

*Primary Examiner* — Ross N Gushi
(74) *Attorney, Agent, or Firm* — Maier & Maier, PLLC (57) ABSTRACT

A socket device for electrically contacting a corresponding plug device. The socket device has a first contact part having a first contact surface arranged radially between an outer first and inner second touch protection part, beyond which the first and second touch protection part axially protrude, a centrally arranged coupling unit, a receptacle region for receiving a corresponding third touch protection part of the plug device, and at least one insulating part, which is arranged extending in the radial direction on the first and/or second touch protection part and at a height above the first contact surface in such a way that the at least one insulating (Continued)

part at least partially overlaps with the first receptacle region but does not overlap with the first contact surface in a top view of the socket device.

14 Claims, 3 Drawing Sheets

(51) Int. Cl.
*H01R 13/621* (2006.01)
*H01R 13/64* (2006.01)

(56) References Cited

U.S. PATENT DOCUMENTS 10,381,752 B2* 8/2019 Kaehny ............... H01R 13/621
2018/0294600 A1  10/2018 Loncar et al.

FOREIGN PATENT DOCUMENTS

| DE | 102016206378 | A1 | 10/2017 |
| DE | 102017210425 | A1 | 12/2018 |
| EP | 0709926 | A1 | 5/1996 |
| EP | 1081799 | A2 | 3/2001 |
| EP | 1081799 | A3 | 4/2003 |

OTHER PUBLICATIONS

German Examination Report dated Jan. 20, 2020 in corresponding German Application No. 10 2019 205 050.6; 24 pages; Machine translation attached.
International Search Report (with English translation) and Written Opinion (with Machine translation) dated May 27, 2020 in corresponding International Application No. PCT/EP2020/057285; 19 pages.
Office Action dated Dec. 20, 2022 in corresponding Chinese Application No. 202080018091.5, 15 pages.

* cited by examiner

SOCKET DEVICE FOR THE TOUCH-PROOF ELECTRICAL CONTACTING OF A CORRESPONDING PLUG DEVICE, PLUG DEVICE AND BATTERY MODULE FOR A HIGH-VOLTAGE BATTERY

FIELD

The invention relates to a socket device for electrically contacting a corresponding plug device, wherein the socket device has a first contact part having a first contact surface for electrically contacting a second contact surface of a corresponding second contact part of the corresponding plug device and a first coupling unit which is centrally arranged with respect to the first contact part and extends an axial connection direction for mechanical connection to a corresponding second coupling unit of the plug device. In addition, the socket device comprises a first electrically insulating touch protection part in the form of a first insulating jacket, which protrudes beyond the first contact part in the axial connection direction and at least largely, preferably completely, surrounds the at least one first contact part in a circumferential direction. In addition, the socket device has an electrically insulating second touch protection part, which also protrudes beyond the first contact part in the first axial connection direction and is arranged in the radial direction inside the first insulating jacket, so that the first contact surface is arranged between the first and second touch protection parts. Furthermore, the socket device has a first receptacle region, formed by a free region and at least largely, preferably completely, surrounding at least the second touch protection part and the first coupling unit in the circumferential direction, for receiving a corresponding second insulating jacket of the corresponding plug device. The invention also includes a corresponding plug device for electrically contacting such a socket device, as well as a battery module for a high-voltage battery of a motor vehicle, which has such a socket device and/or plug device for electrically contacting the battery module with a second battery module.

BACKGROUND

Socket devices and plug devices of the type mentioned are known from the prior art. These can be used, for example, as module connectors for electrically contacting battery modules of a high-voltage battery. Touch protection plays a central role in such high-voltage applications in particular, which is why the respective components of such a module connector, for example the socket device and the corresponding plug device to be coupled to the socket device, are usually made touch-proof, even in the state not coupled to one another, with respect to the touch by a human finger, which can be represented by a standard finger.

In this context, DE 10 2017 210 425 A1 describes a module connector which comprises two connection parts connectable to one another in an electrically conductive manner. These connection parts have respective electrically conductive contact surfaces which are in contact with one another in the coupled state of the connection parts. To fasten the two connection parts to one another, one of the connection parts has a centrally arranged screw and the other of the connection parts has a centrally arranged threaded socket. Furthermore, each of the connection parts has an outer insulating collar which protrudes beyond the respective contact elements in the axial direction, as well as respective inner touch protection elements, which are also designed to be electrically insulating, and also protrude beyond the respective contact surfaces as well as the screw in the direction of their end facing away from the screw head and on the other hand also protrude beyond the threaded socket. These two touch protection elements, namely the outer and the inner, which are assigned to a respective connection part, prevent a finger from being able to touch any electrically conductive elements, since these touch protection parts have a spacing from one another such that no (standard) finger fits between them. A similar connection arrangement is also described in DE 10 2016 206 378 A1.

Furthermore, DE 10 2014 203 128 A1 also describes an electrical connection device for the electrical high-voltage connection of two connection elements. In this case, however, the screw and the screw nut that are used to mechanically connect the two connecting elements are electrically insulated from the actual contact elements of the connecting elements in question. The screw and the nut as such therefore no longer have to be designed as a touch-protected, on the other hand, however, in this way the electrically conductive material of the screw and the nut can no longer be used as an additional line cross section, and moreover in this way the screw connection also has to be effectuated via a nonmetallic element, such as an electrically insulating washer, which is expensive to produce since it has to be made of a material which is nonconductive and is nonetheless sufficiently heat resistant and is also to withstand particularly high mechanical strains to provide a sufficiently large contact pressure and thus a sufficiently stable connection of the two connecting elements.

SUMMARY

The object of the present invention is to provide a socket device, a corresponding plug device, and a battery module for a high-voltage battery, which make it possible to further increase the safety when connecting the socket device to the corresponding plug device in the simplest, most economical, and, above all, space-saving and compact manner.

This object is achieved by a socket device, by a plug device, and by a battery module. Advantageous embodiments of the invention are the subject matter of the description, and the figures.

A socket device according to the invention for electrically contacting a corresponding plug device, has a first contact part having a first contact surface for electrically contacting a second contact surface of a corresponding second contact part of the corresponding plug device and a first coupling unit which is centrally arranged with respect to the first contact part and extends an axial connection direction for mechanically connecting to a corresponding second coupling unit of the plug device. In addition, the socket device has a first electrically insulating touch protection part in the form of a first insulating jacket, which protrudes beyond the first contact part in the axial connection direction and at least largely, preferably completely, surrounds the at least one first contact part in a circumferential direction. In addition, the socket device has an electrically insulating second touch protection part, which also protrudes beyond the first contact part in the first axial connection direction and is arranged in the radial direction inside the first insulating jacket, so that the first contact surface is arranged between the first and second touch protection parts. Furthermore, the socket device comprises a first receptacle region, formed by a free region and at least largely, preferably completely, surrounding at least the second touch protection part and the first coupling unit in the circumferential direction, for receiving a corresponding second insulating jacket of the corresponding plug device. In addition, the socket device has at least one insulating part, which is arranged extending in the radial direction on the first and/or second touch protection part and at a height above the first contact surface with respect to the axial connection direction such that the at least one insulating part at least partially overlaps with a part of the first receptacle region, but does not overlap with the first contact surface in a top view of the socket device against the axial connection direction.

The invention is based on the finding that potential hazards when handling high-voltage components can result not only from the fact that voltage-carrying parts could be touched directly by a finger of a user, but in particular also from the fact that such parts are contacted by a tool, which is typically used, for example, for coupling the socket device to the corresponding plug device or for decoupling these two devices. Usual protective measures known in the prior art are only intended to provide touch protection for such individual components, such as a socket device and a plug device, so that a direct touch of voltage-carrying parts by a finger can be excluded. Nevertheless, such contacting, in particular accidental contacting, by a tool is still possible. Especially when the above-mentioned first and second coupling units are designed, for example, as a screw and a corresponding internally threaded socket, a suitable wrench is usually used to couple the socket device to the plug device. Such a wrench can be designed, for example, as a tubular socket wrench or having a suitable socket, so that such a wrench typically also has a type of ring-shaped component having a polygonal inner surface corresponding to the screw head for turning the corresponding screw head. Precisely because of such a ring-shaped component, there is the risk that in conventional socket devices it can get into the intermediate space between the first and second touch protection parts, which is typically also ring-shaped, where the slightly set back contact surface is arranged. Accordingly, there is the risk that, for example, when repairing a battery module or battery or, in case of service, when removing the socket device from the plug device or when contacting these two devices again, such a tool device can inadvertently reach this intermediate space between the two touch protection parts and at worst can come into contact with the contact part of the socket device. Such a contact between the tool and an electrically conductive component of the socket device, such as the first contact part, can result in a short circuit and, in the worst case, also an electric shock for the installer. This risk that such a tool can now get into the intermediate space between the two touch protection parts of the socket device can now advantageously be significantly reduced according to the invention by providing the at least one insulating part, since this results in an effective cross section reduction between these two touch protection parts. The at least one insulating part is also designed to be electrically insulating, that is to say it is made of an electrically insulating material such as a plastic. The fact that the at least one insulating part is arranged at a height above the first contact surface is to be understood to mean that at least the highest point or region of the at least one insulating part with respect to the axial connection direction is arranged above the entire first contact surface. Nonetheless, the at least one insulating part can also extend so far down from its highest point, against the axial connection direction, that its lowest point is below the Kersten contact surface. Multiple such insulating parts can also be used, for which the same can then apply and which are provided, for example, in the form of simple projections or webs, in order to further reduce this risk. Such an insulating part can, for example, protrude in the form of a web or projection or a type of lug from the first touch protection part radially in the direction of the second touch protection part or also from the second touch protection part radially in the direction of the first touch protection part and can thus make it much more difficult for a tool to penetrate between these two touch protection parts. This applies in particular to the wrench described above. Thus, in a particularly advantageous manner, the safety in conjunction with module connectors or in general in conjunction with the described socket device and its corresponding plug device can be significantly increased. In addition, this safety is increased in a particularly simple manner by providing at least one insulating part, so that all other components of the socket device and the corresponding plug device can essentially remain the same in terms of their design or can manage with very minor modifications that do not require any additional installation space. The tools usually used during the installation and removal can also remain unchanged and do not additionally require separate or additional or special high-voltage-suitable insulation protection or the like. In this way, additional costs can be saved and safety can be increased in a particularly space-efficient and compact manner.

The socket device and the corresponding plug device described in more detail below are preferably two components of a module connector that are connected to one another for coupling, in particular for electrically contacting, two battery modules of a high-voltage battery of a motor vehicle. The terms socket device and plug device per se are only intended to express that they are designed correspondingly with regard to their coupling mechanism, specifically in such a way that the socket device is electrically and mechanically connectable to the corresponding plug device. Furthermore, in general, no further features are intended to be implied by this choice of terms as such. In the same way, the socket device and the corresponding plug device could also be referred to as the first and second coupling unit or the like.

The first contact part having the first contact surface of the socket device, as well as the corresponding second contact part of the plug device, are designed to be electrically conductive, i.e., made of an electrically conductive material, preferably a metal or an alloy, and the first and second coupling unit are also preferably largely designed to be electrically conductive, in particular also made of an electrically conductive material, for example metal or an alloy. Furthermore, it is preferred that the first coupling unit is not electrically insulated from the first contact part, for example, but can also contact it mechanically, for example, is arranged on it or is even formed in one piece with it. The same also applies to the second coupling unit and the second contact part of the corresponding plug device. Since the second coupling unit of the corresponding plug device, as described in more detail below, is preferably designed as a screw with a screw head, it is particularly preferred in connection with this second coupling unit that this second coupling unit may move, in particular rotate and move in the axial direction, in relation to the second contact part. Nevertheless, the second coupling unit and the second contact part can still be arranged in direct contact with one another.

The socket device and also the corresponding plug device, taken individually, are designed to be touch-proof even when they are not connected to one another, in particular with regard to a touch by a human finger or standard finger. In other words, electrically conductive parts, components, or surfaces of the socket device and also of the plug device cannot be touched by a human finger, in particular a standard finger, due to the corresponding design of the corresponding touch protection. For example, the above-mentioned screw head can have a casing made of an electrically insulating material. This has the great advantage that thus, on the one hand, the respective coupling units as electrical conductors can themselves contribute to enlarging the line cross-section. In other words, this in turn enables a significantly more compact design of the socket device as well as the plug device, since a required, reasonable line cross section for the application can be provided not only by the design of the respective contact parts, but also in addition by the respective coupling units. In addition, a particularly stable connection between the two coupling units of the socket device and the plug device may be provided in this way, since both can be made of metallic material, for example, and can be connected to one another without electrically insulating parts located between them. The coupling units also do not have to be insulated from the respective contact parts in a costly manner.

Furthermore, it is advantageous if the second touch protection part, which is thus located inside the first touch protection part in the radial direction and protrudes beyond the first contact part in the axial direction, which corresponds to the connection direction in which the socket device is connectable to the corresponding plug device, also protrudes beyond the first coupling unit itself. This advantageously ensures that this first coupling unit cannot be touched by a finger against the axial connection direction. In particular, this second touch protection part can directly adjoin the first coupling unit in the axial connection direction.

In order that the coupling of the two contact parts, in particular their contact surfaces, of the socket device and the corresponding plug device is not impaired, it is thus advantageous if the at least one insulating part is arranged on the first and/or second touch protection part so that the at least one insulating part at least partially overlaps with a part of the at least one first receptacle region, but does not overlap with the first contact surface, in a top view of the socket device against the axial connection direction. In order that the plug device can still be easily plugged together with the socket device, slots can be provided in a simple manner in the second insulating jacket of the plug device, as will be described in more detail later. Recesses or slots in the second contact surface of the plug device can advantageously be avoided by the described positioning of the at least one insulating part, which would otherwise cause a disadvantageous reduction in the cross section of the contact surface. Depending on the arrangement of this first contact surface or the first contact part relative to the first and second touch protection part, it is then correspondingly advantageous if the insulating part is arranged either on the first touch protection part or on the second touch protection part. If the first contact surface adjoins the first touch protection part in the radial direction, for example, then the at least one insulating part is preferably arranged on the second touch protection part and extends outward in the radial direction. In contrast, if the first contact surface adjoins the second touch protection part in the radial direction, then the at least one insulating part is arranged on the first touch protection part and extends inward in the radial direction. In both cases, it is thus made possible that the touch protection part only extends radially into the first receptacle region, which is provided for receiving a corresponding insulating jacket of the corresponding plug device. However, other design variants are also conceivable here. For example, it can be that the corresponding plug device not only has one such insulating jacket, but rather multiple, for example. A further receptacle region formed by such a free region can then also be provided accordingly. Such a receptacle region can then, for example, adjoin the first electrical touch protection part and a further such receptacle region can adjoin the second touch protection part. In this case, both touch protection parts can also correspondingly have respective insulating parts that extend in the radial direction.

In a preferred variant of the invention, the first contact part having the first contact surface directly adjoins the first coupling unit in the radial direction and the receptacle region for receiving the corresponding second insulating jacket of the corresponding plug device is formed between the first contact surface and the outer, first electrically insulating touch protection part. In this case, it is further preferred that the at least one insulating part is arranged on the first touch protection part and extends in the radial direction inward, in particular in the direction of the second touch protection part. In other words, it represents a further advantageous embodiment of the invention if the first insulating jacket is arranged at a certain radial distance from the first contact surface, wherein the free region forming the receptacle region is arranged in the radial direction between the first contact surface and the first insulating jacket, and wherein the at least one insulating part is arranged on the first insulating jacket and extends radially inward. This design may also further reduce the risk of a tool touching the first contact surface, since with such a design the first contact surface has a smaller radius or diameter than the receptacle region surrounding this contact surface, and also typical screwing tools, such as the wrench described above, have to have a sufficiently large diameter in order to be able to enclose the corresponding screw head for screwing the socket device to the corresponding plug device. If the at least one insulating part were not present, such a wrench could only penetrate into an outer region of this intermediate space between the first and second touch protection part. However, it is precisely there that penetration is prevented in a particularly effective manner by the provision of the at least one insulating part. Thus, if at all, only devices that are ring-shaped and have a very small diameter could still penetrate into this region between the two touch protection parts. However, such devices would then typically no longer be suitable as tools for screwing the socket device to the plug device due to their diameter being too small, since the screw head of the screw unit of the corresponding plug device could no longer be enclosed by such a tool.

In a further advantageous embodiment of the invention, the first coupling unit is designed as an internally threaded socket for mechanical connection to the second coupling unit of the corresponding plug device, which is designed as a screw unit, for example as a screw, threaded bolt, or the like. A particularly stable mechanical connection between the socket device and the plug device may be established by means of a screw connection, and a screw connection may also be implemented particularly easily. In addition, this design has the great advantage that a particularly high degree of safety can be provided by the invention, especially in conjunction with typical screwing tools, for example wrenches.

In a further advantageous embodiment of the invention, the socket device has multiple insulating parts arranged spaced apart from one another in the circumferential direction and comprising the at least one insulating part, wherein the insulating parts are each arranged on the first and/or second touch protection part at a height above the first contact surface with respect to the axial connection direction. The fact that the insulating parts are arranged at a height above the first contact surface is also again to be understood to mean here that at least the highest point or region of the respective insulating parts with respect to the axial connection direction is arranged above the entire first contact surface. By providing multiple such insulating parts, the probability of a tool penetrating into the described intermediate space between the two touch protection parts can be further reduced. At least two insulating parts are preferred, but preferably also more than two insulating parts, for example three or four or five or six, etc. The distances between the multiple insulating parts in the circumferential direction are preferably equal, since such a homogeneous distribution of the respective insulating parts in the circumferential direction provides isotropic penetration protection. Penetration of a tool can thereby be prevented particularly efficiently with particularly few insulating parts.

In a further advantageous embodiment of the invention, the at least one insulating part has a length in the radial direction which measures at least a large part of a width of the receptacle region in the radial direction and at most measures the width of the receptacle region in the radial direction. The fact that the length of the insulating part measures at most the width of the receptacle region ensures that the insulating part is not arranged in overlap with the first contact surface in the top view against the axial connection direction. Because, on the other hand, the insulating part measures at least a large part of the width of this receptacle region, preferably is even longer, the probability of a tool penetrating this intermediate space can be prevented even more efficiently, since an effective cross-sectional reduction can be provided more effectively the longer the respective insulating parts extend in the radial direction.

Furthermore, it is particularly advantageous if the at least one insulating part is not completely circumferential in the circumferential direction, but rather multiple such insulating parts arranged distributed in the circumferential direction are provided in order to provide the most secure penetration protection possible, since this at the same time enables a particularly secure design of the plug device. This is because in particular the second insulating jacket of the plug device is to be inserted into the receptacle region into which these insulating parts now protrude. However, this would no longer be possible or only with a correspondingly thin design of a wall of this second insulating jacket if the at least one insulating part were designed as a completely circumferential ring. However, because one or more separate insulating parts are provided in the circumferential direction, for example, the second insulating jacket of the plug device, which is to be inserted into this receptacle region of the socket device, can simply be designed with corresponding grooves or slots. These advantageously do not impair the protective function of this jacket, since such slots can then, for example, be made so narrow that finger touch protection is still provided. This may be effectuated simply in that the insulating parts are also formed having a correspondingly small width in the circumferential direction, which therefore preferably measures significantly less than a diameter of a standard finger.

The width of the respective insulating parts in the circumferential direction is preferably also less than the length of the respective insulating parts in the radial direction. The height of the respective insulating parts, that is to say their dimensions in the axial direction, are in principle not subject to any restrictions. In principle, these can be made as tall as the space available in the axial direction permits. With the largest possible dimensions of these insulating parts in the axial direction, the stability of these insulating parts can be increased and, as a result, their robustness and, accordingly, also the penetration security provided by these insulating parts. Accordingly, it is preferred that the height of the insulating parts in the axial direction is at least as great as their width in the circumferential direction.

In a further advantageous embodiment of the invention, the first insulating jacket has a first latching element, arranged in an outer jacket region opposite to the at least one insulating part, for coupling to a corresponding second latching element of the plug device. On the one hand, the provision of such latching elements is advantageous, since this can provide an additional fixation of the socket device on the plug device, which can be used, for example, as a "pre-adjustment" of these two components in order to facilitate subsequent assembly by screwing these two devices together. In order to provide such a latching element, in particular a first latching element, it can be arranged, for example, as a corresponding lug or spring or generally as a part protruding from the outer jacket surface on the outer jacket surface of the first insulating jacket. The corresponding second latching element of the plug device can then be shaped, for example, in the form of a tab having a corresponding recess, into which the spring or the lug can then engage when the socket device and the plug device are plugged together. If such a first latching element protrudes in the radial direction outward from the first insulating jacket, the corresponding tab, which provides the second latching element of the plug device, is also arranged at least partially at a distance from the second insulating jacket of the corresponding plug device in the radial direction to the outside, so that the first insulating jacket having the first latching element can be inserted at least somewhat between the tab and the second insulating jacket of the plug device. Furthermore, this second insulating jacket of the plug device can, as described above, have corresponding slots which correspond to the corresponding insulating parts on the first insulating jacket of the socket device, so that this second insulating jacket of the plug device can also still be inserted into the receptacle region of the socket device without any problems. Because the at least one insulating part is now arranged in such a region which is opposite to the outer jacket region in which the first latching element is arranged, it is achieved that the corresponding slot in the second insulating jacket of the plug device is also arranged in a region, which is covered at least in part in the radial direction by the tab described or generally by the corresponding second latching element of the plug device. An additional touch protection is provided in this way, since the corresponding slots in the insulating jacket of the plug device are thus all the more difficult to access.

Furthermore, the invention also relates to a corresponding plug device for electrically contacting a corresponding socket device, in particular the socket device according to the invention or one of its embodiments. The plug device has a second contact part for electrically contacting a corresponding first contact part of the corresponding socket device, as well as a second coupling unit, for example a screw unit mentioned at the outset, which is arranged centrally with respect to the second contact part and extends in an axial connection direction, for mechanical connection to a corresponding first coupling unit, for example an internally threaded socket, of the corresponding socket device. In addition, the plug device has an electrically insulating third touch protection part in the form of a second insulating jacket, which protrudes beyond the second contact part in the axial connection direction and at least largely surrounds the at least one second contact part in a circumferential direction, preferably also completely except for the slots optionally provided in the second insulating jacket. Furthermore, the plug device has an electrically insulating fourth touch protection part, which also protrudes beyond the second contact part in the axial connection direction and is arranged in the radial direction inside the second insulating jacket, so that the second contact surface is arranged between the third and fourth touch protection part. Moreover, the third and/or fourth touch protection part is designed for insertion into a corresponding receptacle region of the socket device and has at least one recess extending in the axial connection direction and at least partially in the radial direction, into which an insulating part of the socket device corresponding to the recess is insertable when the plug device is connected to the corresponding socket device.

It should be noted here that the axial connection direction in conjunction with the plug device has now been defined from the point of view of the plug device and, in the state coupled to the corresponding socket device, is opposite to the axial connection direction mentioned and defined in conjunction with the socket device.

The corresponding plug device thus has the great advantage that the second insulating jacket can still be inserted unhindered into the corresponding recess of the corresponding socket device, even if the socket device has insulating parts as described for the socket device according to the invention and its embodiments. When the plug device is plugged together with the corresponding socket device, these insulating parts penetrate into the respective correspondingly provided recesses in the second insulating jacket. These recesses do not have to completely penetrate the second insulating jacket of the plug device, but can, depending on the length of the insulating parts, also only partially penetrate into the insulating jacket of the plug device, that is to say in the form of a groove.

However, it is particularly advantageous and therefore preferred that the at least one recess is formed as a slot extending in the axial connection direction to the second insulating jacket. This advantageously makes it possible to form the insulating parts having a length in the radial direction which corresponds to the full width of the receptacle region in the radial direction, whereby the safety and the protection against penetration can be maximized. In addition, such slots are particularly easy to manufacture in the second insulating jacket. The slots furthermore have a width in the circumferential direction which is at least as great as a width of the above-described insulating parts in the circumferential direction. The advantages described for the socket device according to the invention and its embodiments also apply in a corresponding manner to the plug device according to the invention. The features described with reference to the corresponding plug device in conjunction with the socket device according to the invention and its embodiments also apply in the same way to the plug device according to the invention.

For example, it is advantageous if the second coupling unit is designed as a screw unit as described. The screw unit can thus have a screw head, for example, which is preferably rotatable by means of a tool, in particular a wrench, with at least part of the screw head being enclosed in a formfitting manner by a part of the tool, wherein the part of the tool by means of which the part of the screw head can be enclosed in a formfitting manner has an external diameter which is larger than a minimum internal diameter of the second insulating jacket and smaller than a maximum external diameter of the part of the second insulating jacket that is inserted into the receptacle region of the socket device when the plug device is connected to the corresponding socket device. In other words, the screw unit can be screwed to the corresponding socket device using a conventional screwing tool, in particular a wrench, which in principle, i.e., without the provision of the insulating parts on the touch protection of the corresponding socket device, could be inserted into the intermediate space between the two touch protection parts of the socket device. As described, it is now advantageously made possible by the invention to use conventional screwing tools for screwing the plug device to the socket device or also for detaching these two devices from one another without having to take any safety risks due to touching of a contact of the socket device by such a tool.

In a further advantageous embodiment of the plug device, the plug device has at least one tab made of an insulating material, which has a second latching element for coupling to a first latching element of the corresponding socket device, wherein the tab is arranged radially outside the second insulating jacket and at a distance from the second insulating jacket, wherein the tab is also arranged in relation to the radial direction in a region opposite to the at least one recess arranged in the second insulating jacket. This advantageous positioning of the tabs, which function as latching elements, in relation to the described at least one recess in the second insulating jacket provides an additional touch protection, as already described above.

Furthermore, a connecting system having a socket device according to the invention or one of its embodiments and a plug device according to the invention or one of its embodiments is also to be regarded as belonging to the invention. Such a connector system is preferably designed as a module connector for electrically contacting two battery modules.

Furthermore, the invention also relates to a battery module for a high-voltage battery of a motor vehicle, wherein the battery module has a socket device according to the invention or one of its embodiments and/or a plug device according to the invention or one of its embodiments for electrically contacting the battery module with a second battery module. Such a battery module preferably has both a socket device and a plug device, wherein the socket device is coupled to a first pole of the battery module and the plug device to a second pole of the battery module. By means of the socket devices and plug devices designed in this way, respective battery modules can then advantageously be coupled to one another in a simple manner and thereby connected in series, for example. The whole thing may now be provided in a particularly safe manner.

Moreover, the invention is also considered to include a high-voltage battery having such a battery module, and also a motor vehicle having such a high-voltage battery. The advantages described with reference to the socket device according to the invention and its embodiments and the advantages described with reference to the plug device according to the invention and its embodiments thus also apply in the same way to the battery module according to the invention, to the high-voltage battery according to the invention, and to the motor vehicle according to the invention.

The invention also includes refinements of the method according to the invention, which have features as already described in the context of the refinements of the motor vehicle according to the invention. For this reason, the corresponding refinements of the method according to the invention are not described again here.

The motor vehicle according to the invention is preferably designed as an automobile, in particular as a passenger car or truck, or as a passenger bus or motorcycle.

The invention also comprises the combinations of the features of the described embodiments.

BRIEF DESCRIPTION OF THE FIGURES

Exemplary embodiments of the invention are described hereinafter. In the figures.

DETAILED DESCRIPTION

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those shown. Furthermore, the described embodiments can also be supplemented by further features of the invention that have already been described.

In the figures, the same reference numerals designate elements that have the same function.

Figure 1:
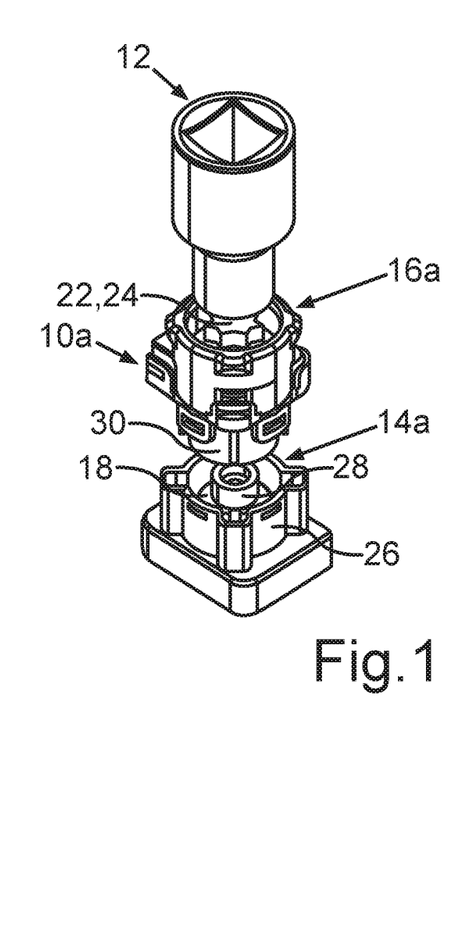
FIG. 1 shows a schematic illustration of a connector system having a socket device, a plug device, and a screwing tool according to the prior art.

FIG. 1 shows a schematic and perspective illustration of a connector system 10a and a screwing tool 12 according to the prior art. The connector system 10a can be designed as a module connector for connecting second battery modules of a high-voltage battery. Furthermore, the connector system 10a comprises a socket device 14a and a plug device 16a that can be coupled to this, in particular can be electrically contacted. This socket device 14a is shown schematically once again in FIG. 2 in a perspective cross-sectional illustration together with the screwing tool 12. The socket device 14a has a first contact part 18, which can also be made in several parts, wherein then the individual parts of the contact part 18, as in this example two parts 18, can also be connected to one another in a materially bonded manner. The contact part 18 can, however, also be formed in one piece. This contact part 18 is provided for electrically contacting a corresponding second contact part of the corresponding plug device 16a. Correspondingly, the contact part 18 is made of an electrically conductive material, in particular a metal and/or an alloy, and provides a contact surface 18a. Furthermore, the socket device 14a has a centrally arranged first coupling unit in the form of an internally threaded socket 20 extending in an axial connection direction A. This internally threaded socket 20 is also made electrically conductive, i.e., made of an electrically conductive material, such as a metal or an alloy, and is additionally arranged on the contact part 18, in particular connected to it in a materially bonded manner, and furthermore arranged centrally with respect to the contact part 18 in the radial direction R (cf. FIG. 2).

This internally threaded socket 20 is also provided to be coupled to a corresponding screw 22 having external thread of the plug device 16a, in particular to be screwed to it. Of this screw 22, only the screw head 24 can be seen in FIG. 1. If the plug device 16a and the socket device 14a are ultimately screwed together, the second contact part of the plug device 16a is correspondingly in direct contact with the contact part 18 of the socket device 14a. The second contact part of the plug device 16a cannot be seen in FIG. 1 and FIG. 2, but can be designed like the second contact part 36 shown in FIG. 5. The respective contact parts 18, 36 are furthermore coupled to corresponding poles of a battery module for a high-voltage battery of a motor vehicle. Correspondingly, a current flows via these contact parts 18, 36 when they are in contact with one another. But even without the contacting of these two devices 16a, 14a, a voltage is applied to the respective contact parts 18, so that for safety reasons a corresponding touch protection has two be provided for these two devices 14a, 16a. In other words, both the socket device 14a and the plug device 16a are designed to be protected against touch when they are not connected to one another, so that touching the respective contact parts 18 with a finger, in particular a standard finger, is not possible.

For this purpose, the socket device 14a comprises a first electrically insulating touch protection part 26, which provides an outer housing made of a non-conductive material, for example a plastic. This first touch protection part 26 is designed in the form of a first insulating jacket which protrudes beyond the first contact part 18 in the axial connection direction A and moreover surrounds the at least one first contact part 18 at least largely, in particular completely, in a circumferential direction U. This circumferential direction U is illustrated schematically in FIG. 2 by the semicircular arrow extending around the axial direction A. In addition, the socket device 14a also comprises an electrically insulating second touch protection part 28, which also protrudes beyond the first contact part 18 in the first axial connection direction A and is arranged in the radial direction R inside the first insulating jacket 26, so that a first contact surface 18a is arranged between the first and second touch protection parts 26, 28. This second touch protection part 28 is designed in this example as an inner ring made of a non-conductive material, which is seated directly on the internally threaded socket 20 in the axial direction A and thus directly adjoins this internally threaded socket 20 in the axial connection direction A. The contact surface 18a represents that surface of the contact part 18 which touches the corresponding contact part of the plug device 16a in the coupled state. Such a design of the socket device 14a with the two described touch protection parts 26, 28 can ensure that a human finger cannot touch the contact surface 18a and also other electrically conductive parts of the contact part 18 and the screw unit 22.

The corresponding plug device 16a is also formed having corresponding touch protection elements. In particular, this plug device 16a also has an outer, second insulating jacket 30 (cf. FIG. 1), which is also made of an electrically insulating material and which protrudes beyond the second contact part (not visible here) of the plug device 16*a* against the axial connection direction A shown here and preferably completely or at least largely surrounds this second contact part in the circumferential direction U. Also on the screw unit 22 of the plug device 16*a*, opposite the axial connection direction A, a further touch protection part, for example as an inner touch protection pin, can be seated directly on the end of the screw unit 22 opposite to the screw head 24. As a result, the plug device 16*a* also has, so to speak, an outer touch protection part, in particular a third touch protection part 30, and an inner touch protection part, in particular a fourth touch protection part. Since these touch protection parts also protrude beyond the second contact part of the plug device 16*a* against the axial connection direction A shown here, it can also be ensured for the plug device 16*a* that this second contact part of the plug device 16*a* cannot be touched by a finger.

In order to be able to plug the socket device 14*a* together with the plug device 16*a* in a suitable manner, a receptacle region 32 (cf. FIG. 2) for receiving the corresponding second insulating jacket 30 of the plug device 16*a* is furthermore formed by a free region, which surrounds at least the second touch protection part 28 and the internally threaded socket 20 at least largely, in particular completely in the circumferential direction U. In this example, this receptacle region 32 is arranged between the contact surface 18 *a* and the outer insulating jacket 26, viewed in the radial direction R.

In order to connect the socket device 14*a* and the plug device 16*a* to one another, in particular to screw them together, a commercially available screwing tool 12, for example in the form of a wrench, of which only one socket is shown here as an example, can be used. During the initial battery installation, in which the socket device 14*a* is connected and screwed to the plug device 16*a*, the individual process steps are usually automated, so that there can be no endangerment to persons, in particular installation personnel, in any case. However, it can happen that a battery of a motor vehicle has to be serviced or repaired, or at least partially removed and reinstalled for other service reasons. These assembly steps are then usually carried out by appropriately trained personnel who, for this purpose, for example, have to decouple the plug device 16*a* again from the socket device 14*a* and subsequently screw them together again. Due to the typical geometry of such a screwing tool 12 and its dimensions relative to the dimensions of the socket device 14*a*, it is possible that such a screwing tool 12 inadvertently comes into contact with the contact part 18 of the socket device 14*a*, as is shown schematically in FIG. 2. Since such screwing tools 12 are typically also made of metallic material, such an electrical contact between screwing tool 12 and contact part 18 makes it possible to create a short circuit that can result in damage to the battery module and, in the worst case, also a hazard to the installation personnel. This can now advantageously be prevented by the invention or its embodiments, as will now be described in more detail below.

Figure 2:
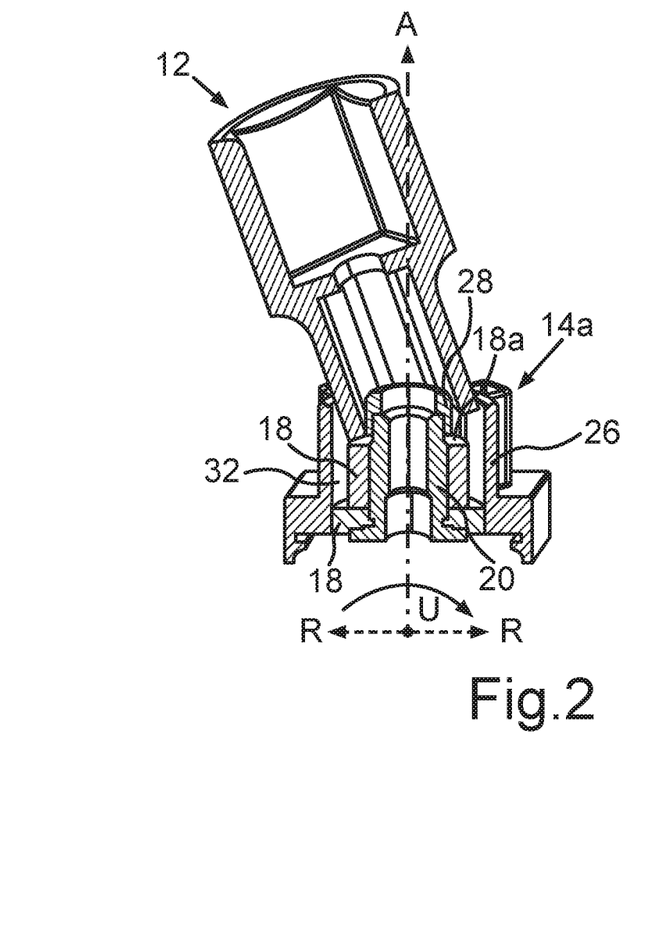
FIG. 2 shows a schematic view of the socket device from FIG. 1 and the screwing tool, which is in contact with a contact part of the socket device, according to the prior art.
Figure 3:
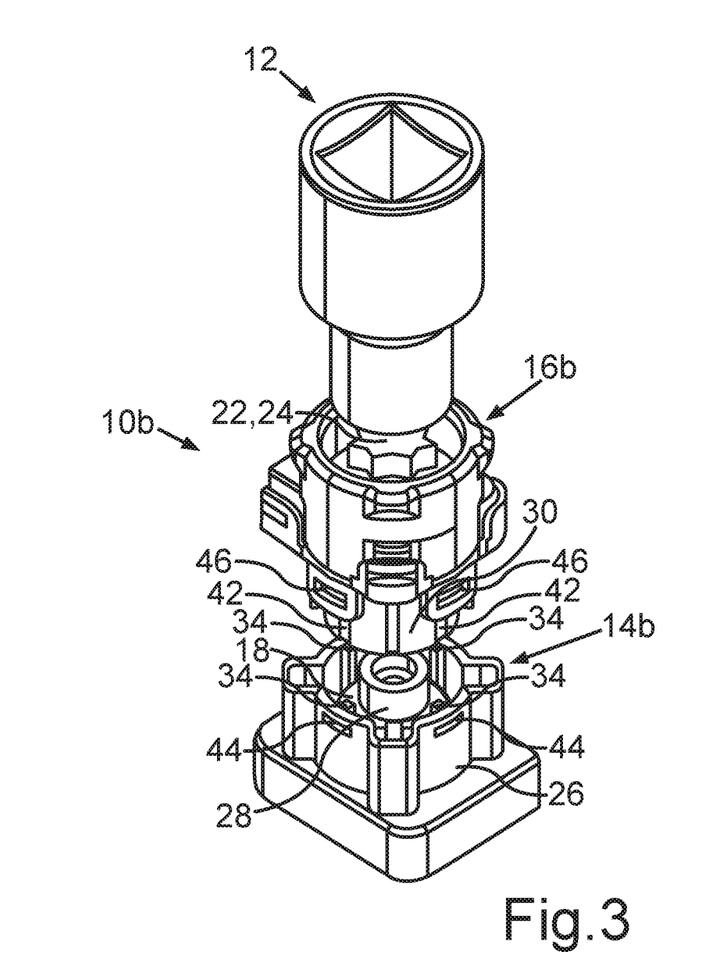
FIG. 3 shows a schematic illustration of a connector system, in particular a module connector, having a socket device and a plug device according to one exemplary embodiment of the invention.

FIG. 3 shows a schematic and perspective illustration of a connector system 10*b*, which can be designed as a module connector, according to an exemplary embodiment of the invention, and a screwing tool 12. The connector system 10*b* in turn comprises a socket device 14*b* and a plug device 16*b*, which are designed to correspond to one another so that they can be electrically contacted with one another. In particular, both the socket device 14*b* and the plug device 16*b* can be designed as described for FIG. 1 and FIG. 2, except for the differences and details described in more detail below.

Figure 4:
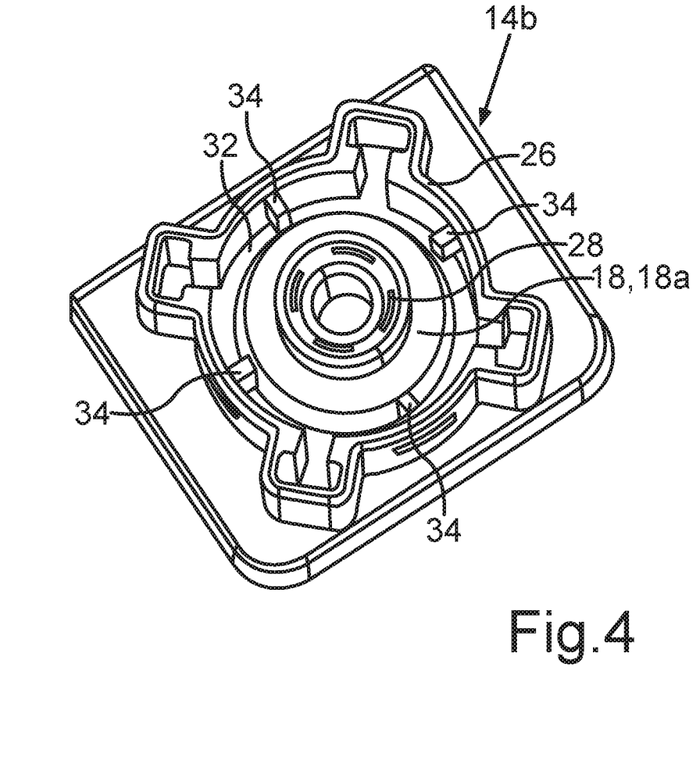
FIG. 4 shows a schematic illustration of the socket device from FIG. 3 according to one exemplary embodiment of the invention.

The socket device 14*b* now advantageously has at least one insulating part 34, in particular four insulating parts 34 in this example, which extends in the radial direction R defined as illustrated in FIG. 2 and is arranged in such a way that these insulating parts 34 at least partially overlap with a part of the first receptacle region 32 but do not overlap with the first contact surface 18*a* in a top view of the socket device 14*b* against the axial connection direction A, which is also defined as illustrated in FIG. 2. In this example, these four insulating parts 34 are still arranged on the first insulating jacket 26, and extend radially inward in the direction of the second touch protection part 28, as can be seen particularly clearly in FIG. 4, which once again shows a schematic illustration of the socket device 14*b* diagonally from above. In this example, these insulating parts 34 are designed in the form of webs which, in particular, are spaced apart from one another in the circumferential direction U and are arranged on the inside along the first insulating jacket 26. These insulating parts 34 preferably extend inward as far as possible in the radial direction R, so that their length in the radial direction preferably corresponds to almost the entire width of the receptacle region 32 in the radial direction R. These insulating parts 34 can now advantageously effectuate an effective cross-sectional reduction of the cross-sectional area between the first and second touch protection parts 26, 28, whereby penetration of a screwing tool 12 is made significantly more difficult or even prevented, as illustrated in FIG. 6, for example.

Figure 5:
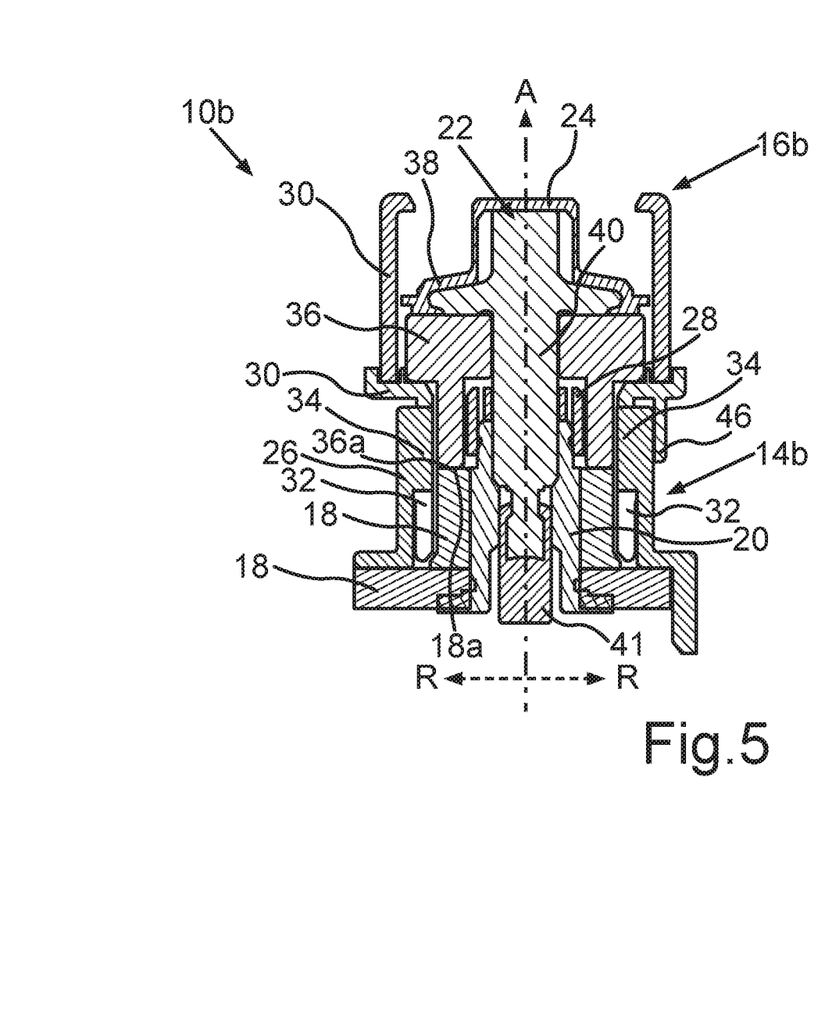
FIG. 5 shows a schematic cross-sectional illustration of the connector system from FIG. 3 according to one exemplary embodiment of the invention.

First, however, FIG. 5 shows a schematic cross-sectional illustration of this connector system 10*b*, as shown in FIG. 3. In this cross-sectional illustration shown in FIG. 5, the individual components of the corresponding plug device 16*b* can now also be clearly seen. The second contact part 36 having the corresponding second contact surface 36*a* of the plug device 16*b* can now also be seen here, which are in contact with the corresponding contact part 18 and its first contact surface 18*a* when the plug device 16*b* is connected to the socket device 14*b*. In addition to the screw head 24, which is in particular surrounded by an electrically insulating casing 38, the screw neck 40 of the screw unit 22 of the plug device 16*b* can also be seen here. Furthermore, the central touch protection part 41 of the plug device 16*b* can also be seen here, which directly adjoins the end of the screw unit 22 opposite to the screw head 24. The screw unit 22 can also be designed to be rotatable with respect to the remaining parts of the second contact part 36 of the plug device 16*b* in order to enable screwing to the corresponding internally threaded socket 20 of the socket device 14*b*.

Figure 6:
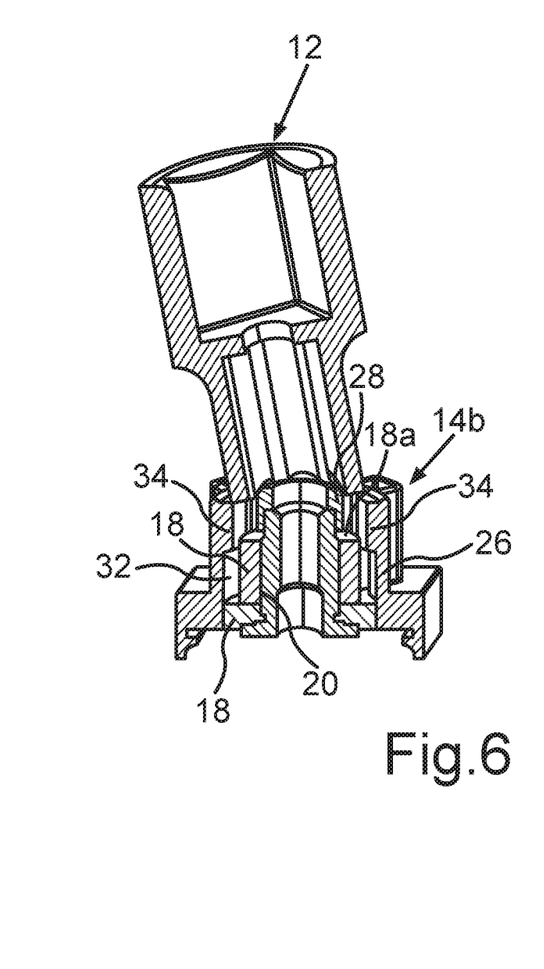
FIG. 6 shows a schematic and perspective cross-sectional view of the socket device from FIG. 3 with a screwing tool, which is prevented by insulating parts of the socket device from touching a contact part of the socket device, according to one exemplary embodiment of the invention.

As can be clearly seen in FIG. 6, the insulating parts 34, which directly adjoin the outer insulating jacket 26 of the socket device 14*b*, in particular can also be formed in one piece with it, extend inward in the radial direction R at most up to the contact surface 18*a* of the first contact part 18 of the socket device 14*b*. In order to enable plugging together with this plug device 16*b* despite these insulating parts 34, which now protrude into at least part of the receptacle region 32 for receiving the corresponding second insulating jacket 30 of the plug device 16*b*, this second insulating jacket 30 of the plug device 16*b* has corresponding slots 42 (cf. FIG. 3), which are located in the second insulating jacket 30 and extend in the axial connection direction A.

Furthermore, the socket device 14*b* as well as the corresponding plug device 16*b* can have corresponding latching elements that can engage in one another and thus enable a pre-adjustment of the socket device 14*b* relative to the plug device 16_b_, in particular before these two devices 14_b_, 16_b_ are screwed together. These latching elements can be formed on the part of the socket device 14_a_ as corresponding radially outwardly directed lugs 44 or projections (cf. FIG. 3), which are arranged on the first insulating jacket 26. The latching elements on the part of the plug device 16_b_ can be formed as corresponding tabs 46 (cf. FIG. 3) which have corresponding recesses into which the lugs 44 can engage. These tabs 46 can be arranged in the radial direction R outside the second insulating jacket 30, in particular at a distance from this insulating jacket 30. The insulating jacket 30 and such a tab 46 can be connected via a non-conductive connecting part that runs in the radial direction and is not designated here, and the insulating jacket 30, the connecting part, and such a tab 46 can also be formed in one piece, for example as a single injection-molded part. In FIG. 5, a tab 46 on the right side is illustrated solely by way of example, but without the associated lug 44 of the socket device 14_b_. It is particularly advantageous if, for example, these latching elements, that is, for example, these lugs 44 of the socket device 14_b_ on the first insulating jacket 26 are arranged on the outside in a region which is opposite to the respective insulating parts 34. As a result, it is possible to effectuate the tabs 46 of the second insulating jacket 30 also being arranged directly to opposite the slots 42 formed in the insulating jacket 30 in the radial direction R, as can be seen, for example, in FIG. 3. As a result, additional touch protection is provided by these tabs 46, since they at least partially overlap the respective slots 42 in the radial direction R.

FIG. 6 shows once again a schematic and perspective cross-sectional illustration of the socket device 14_b_ according to an exemplary embodiment of the invention. This can be designed as described above. As can be seen, the described insulating parts 34, which are arranged on the insulating jacket 26 pointing radially inward, advantageously prevent a screwing tool 12 from penetrating into the intermediate space between the two touch protection parts 26, 28 of the socket device 14_b_. Accordingly, such a screwing tool 12 can be prevented from touching any electrically conductive parts of the socket device 14_b_, in particular the contact parts 18. In general, the described insulating parts 34 can in principle have any desired geometric shape, as long as they at least partially overlap part of the receptacle region 32 in a top view of the socket device 14_b_ against to the axial connection direction A. The number of these insulating parts 34 used can also vary and can be selected matching with the requirement or situation. By introducing webs 34 or generally geometric features made of electrically insulating material, it is thus advantageously possible to prevent the tool 12 from establishing electrical contact with any electrically conductive touch protection part of the socket device 14_b_ and thus a short circuit can no longer be created, in particular not even in a service or repair case.

Overall, the examples show how the invention can provide a tool protection and at the same time a touch-protected connection option of a socket device to a plug device of a module connector, which is made possible in a particularly simple, inexpensive, and compact manner by providing electrically insulating webs and/or geometric features.

The invention claimed is:

1. A socket device for electrically contacting a corresponding plug device, comprising:
   a first contact part having a first contact surface for electrically contacting a second contact surface of a corresponding second contact part of the corresponding plug device;
   a first coupling unit, arranged centrally with respect to the first contact part and extending in an axial connection direction, for mechanical connection to a corresponding second coupling unit of the plug device;
   a first electrically insulating touch protection part in the form of a first insulating jacket which protrudes beyond the first contact part in the axial connection direction and surrounds the at least one first contact part at least largely in a circumferential direction;
   an electrically insulating second touch protection part, which also protrudes beyond the first contact part in the first axial connection direction and is arranged in the radial direction inside the first insulating jacket, so that the first contact surface is arranged between the first and second touch protection parts; and
   a first receptacle region, formed by a free region and at least largely surrounding at least the second touch protection part and the first coupling unit in the circumferential direction, for receiving a corresponding second insulating jacket of the corresponding plug device,
   wherein the socket device has at least one insulating part, which is arranged extending in the radial direction on the first and/or second touch protection part and at a height above the first contact surface with respect to the axial connection direction such that the at least one insulating part at least partially overlaps with a part of the first receptacle region, but does not overlap with the first contact surface in a top view of the socket device against the axial connection direction, and
   wherein the first insulating jacket has a first latching element arranged in an outer jacket region opposite to the at least one insulating part for coupling to a corresponding second latching element of the plug device.

2. The socket device as claimed in claim 1, wherein the at least one insulating part has a length in the radial direction which measures at least a large part of a width of the receptacle region in the radial direction and measures at most the width of the receptacle region in the radial direction.

3. A battery module for a high-voltage battery of a motor vehicle, wherein the battery module comprises the socket device as claimed in claim 1.

4. The socket device as claimed in claim 1, wherein the first coupling unit is designed as an internally threaded socket for mechanical connection to the second coupling unit of the corresponding plug device, which is designed as a screw unit.

5. The socket device as claimed in claim 4, wherein the first insulating jacket is arranged at a certain radial distance from the first contact surface, wherein the free region forming the receptacle region is arranged in the radial direction between the first contact surface and the first insulating jacket, and wherein the at least one insulating part is arranged on the first insulating jacket and extends radially inward.

6. The socket device as claimed in claim 4, wherein the socket device has multiple insulating parts arranged spaced apart from one another in the circumferential direction and comprising the at least one insulating part, wherein the insulating parts are each arranged on the first and/or second touch protection part at a height above the first contact surface with respect to the axial connection direction.

7. The socket device as claimed in claim 4, wherein the at least one insulating part has a length in the radial direction which measures at least a large part of a width of the receptacle region in the radial direction and measures at most the width of the receptacle region in the radial direction.

8. The socket device as claimed in claim 1, wherein the first insulating jacket is arranged at a certain radial distance from the first contact surface, wherein the free region forming the receptacle region is arranged in the radial direction between the first contact surface and the first insulating jacket, and wherein the at least one insulating part is arranged on the first insulating jacket and extends radially inward.

9. The socket device as claimed in claim 8, wherein the socket device has multiple insulating parts arranged spaced apart from one another in the circumferential direction and comprising the at least one insulating part, wherein the insulating parts are each arranged on the first and/or second touch protection part at a height above the first contact surface with respect to the axial connection direction.

10. The socket device as claimed in claim 8, wherein the at least one insulating part has a length in the radial direction which measures at least a large part of a width of the receptacle region in the radial direction and measures at most the width of the receptacle region in the radial direction.

11. The socket device as claimed in claim 1, wherein the socket device has multiple insulating parts arranged spaced apart from one another in the circumferential direction and comprising the at least one insulating part, wherein the insulating parts are each arranged on the first and/or second touch protection part at a height above the first contact surface with respect to the axial connection direction.

12. The socket device as claimed in claim 11, wherein the at least one insulating part has a length in the radial direction which measures at least a large part of a width of the receptacle region in the radial direction and measures at most the width of the receptacle region in the radial direction.

13. A plug device for electrically contacting a corresponding socket device, comprising:

a second contact part for electrically contacting a corresponding first contact part of the corresponding socket device;

a second coupling unit, arranged centrally with respect to the second contact part and extending in an axial connection direction, for mechanical connection to a corresponding first coupling unit of the corresponding socket device;

an electrically insulating third touch protection part in the form of a second insulating jacket which protrudes beyond the second contact part in the axial connection direction and surrounds the at least one second contact part at least largely in a circumferential direction; and an electrically insulating fourth touch protection part, which also protrudes beyond the second contact part in the first axial connection direction and is arranged in the radial direction inside the second insulating jacket, so that the second contact surface is arranged between the second and third touch protection parts, wherein the third and/or fourth touch protection part is designed for insertion into a corresponding receptacle region of the socket device and has at least one recess extending in the axial connection direction and at least partially in the radial direction, into which an insulating part of the socket device corresponding to the recess is insertable when the plug device is connected to the corresponding socket device, and wherein the plug device has at least one tab made of an insulating material, which has a second latching element for coupling with a first latching element of the corresponding socket device, wherein the tab is arranged radially outside the second insulating jacket and at a distance from the second insulating jacket, wherein the tab is arranged in relation to the radial direction in a region opposite to the at least one recess arranged in the second insulating jacket.

14. The plug device as claimed in claim 13, wherein the at least one recess is formed as a slot extending in the axial connection direction in the second insulating jacket.

* * * * *